United States Patent
Ma et al.

(10) Patent No.: US 8,472,423 B2
(45) Date of Patent: Jun. 25, 2013

(54) PHYSICAL LAYER STRUCTURES AND INITIAL ACCESS SCHEMES IN AN UNSYNCHRONIZED COMMUNICATION NETWORK

(75) Inventors: Jianglei Ma, Kanata (CA); Ming Jia, Ottawa (CA); Peiying Zhu, Kanata (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/780,336

(22) Filed: May 14, 2010

(65) Prior Publication Data
US 2010/0226334 A1    Sep. 9, 2010

Related U.S. Application Data

(63) Continuation of application No. 10/760,424, filed on Jan. 21, 2004, now Pat. No. 7,738,437.

(60) Provisional application No. 60/441,105, filed on Jan. 21, 2003.

(51) Int. Cl.
*H04B 7/216* (2006.01)
*H04N 1/00* (2006.01)
*H04J 11/00* (2006.01)

(52) U.S. Cl.
USPC ............ 370/342; 370/335; 370/208; 375/145

(58) Field of Classification Search
USPC .. 370/208, 210, 335, 338, 350, 342; 375/140, 375/146, 147
See application file for complete search history.

(56) References Cited

U.S. PATENT DOCUMENTS

| | | | |
|---|---|---|---|
| 5,867,478 A * | 2/1999 | Baum et al. | 370/203 |
| 6,515,960 B1 | 2/2003 | Usui | |
| 6,567,383 B1 | 5/2003 | Bohnke | |
| 6,643,281 B1 | 11/2003 | Ryan | |
| 6,731,594 B1 * | 5/2004 | Bohnke | 370/208 |
| 6,741,578 B1 | 5/2004 | Moon | |
| 6,894,995 B2 * | 5/2005 | Chitrapu et al. | 370/335 |
| 7,039,001 B2 | 5/2006 | Krishnan | |
| 2003/0081538 A1 | 5/2003 | Walton | |
| 2003/0147365 A1 * | 8/2003 | Terasawa et al. | 370/335 |
| 2004/0085946 A1 | 5/2004 | Morita et al. | |

* cited by examiner

*Primary Examiner* — George Eng
*Assistant Examiner* — Nam Huynh
(74) *Attorney, Agent, or Firm* — Meyertons, Hood, Kivlin, Kowert & Goetzel, P.C.; Stephen J. Curran

(57) ABSTRACT

Physical layer structures and related access schemes for unsynchronized communication networks are provided. Access channel information, preferably including a common synchronization code associated with all transceiver stations in a communication network and a cell-specific synchronization code uniquely associated with one of the transceiver stations, is modulated onto at least one set of time-continuous signal components of a communication signal. In order to access the communication network, communication terminals search for the access channel information in one or more sets of time-continuous signal components and synchronization parameters are then determined based on a location of the access channel information in the sets of time-continuous signal components. Some embodiments of the invention provide for joint frame synchronization and coarse timing synchronization. In further embodiments, the communication signal also includes a scattered pilot channel onto which a portion of the access channel information, preferably the cell-specific synchronization code, is modulated. The pilot channels may then be re-used for initial access operations in addition to its conventional uses for such operations as channel estimation.

18 Claims, 11 Drawing Sheets

| Scrambling Code Group | slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 0 | 1 | 1 | 2 | 8 | 9 | 10 | 15 | 8 | 10 | 16 | 2 | 7 | 15 | 7 | 16 |
| Group 1 | 1 | 1 | 5 | 16 | 7 | 3 | 14 | 16 | 3 | 10 | 5 | 12 | 14 | 12 | 10 |
| Group 2 | 1 | 2 | 1 | 15 | 5 | 5 | 12 | 16 | 6 | 11 | 2 | 16 | 11 | 15 | 12 |
| Group 3 | 1 | 2 | 3 | 1 | 8 | 6 | 5 | 2 | 5 | 8 | 4 | 4 | 6 | 3 | 7 |
| Group 4 | 1 | 2 | 16 | 6 | 6 | 11 | 15 | 5 | 12 | 1 | 15 | 12 | 16 | 11 | 2 |
| Group 5 | 1 | 3 | 4 | 7 | 4 | 1 | 5 | 5 | 3 | 6 | 2 | 8 | 7 | 6 | 8 |
| Group 6 | 1 | 4 | 11 | 3 | 4 | 10 | 9 | 2 | 11 | 2 | 10 | 12 | 12 | 9 | 3 |
| Group 7 | 1 | 5 | 6 | 6 | 14 | 9 | 10 | 2 | 13 | 9 | 2 | 5 | 14 | 1 | 13 |
| Group 8 | 1 | 6 | 10 | 10 | 4 | 11 | 7 | 13 | 16 | 11 | 13 | 6 | 4 | 1 | 16 |
| Group 9 | 1 | 6 | 13 | 2 | 14 | 2 | 6 | 5 | 5 | 13 | 10 | 9 | 1 | 14 | 10 |
| Group 10 | 1 | 7 | 8 | 5 | 7 | 2 | 4 | 3 | 8 | 3 | 2 | 6 | 6 | 4 | 5 |
| Group 11 | 1 | 7 | 10 | 9 | 16 | 7 | 9 | 15 | 1 | 8 | 16 | 8 | 15 | 2 | 2 |
| Group 12 | 1 | 8 | 12 | 9 | 9 | 4 | 13 | 16 | 5 | 1 | 13 | 5 | 12 | 4 | 8 |
| Group 13 | 1 | 8 | 14 | 10 | 14 | 1 | 15 | 15 | 8 | 5 | 11 | 4 | 10 | 5 | 4 |
| Group 14 | 1 | 9 | 2 | 15 | 15 | 16 | 10 | 7 | 8 | 1 | 10 | 8 | 2 | 16 | 9 |
| Group 15 | 1 | 9 | 15 | 6 | 16 | 2 | 13 | 14 | 10 | 11 | 7 | 4 | 5 | 12 | 3 |
| Group 16 | 1 | 10 | 9 | 11 | 15 | 7 | 6 | 4 | 16 | 5 | 2 | 12 | 13 | 3 | 14 |
| Group 17 | 1 | 11 | 14 | 4 | 13 | 2 | 9 | 10 | 12 | 16 | 8 | 5 | 3 | 15 | 6 |
| Group 18 | 1 | 12 | 12 | 13 | 14 | 7 | 2 | 8 | 14 | 2 | 1 | 13 | 11 | 8 | 11 |
| Group 19 | 1 | 12 | 15 | 5 | 4 | 14 | 3 | 16 | 7 | 8 | 6 | 2 | 10 | 11 | 13 |
| Group 20 | 1 | 15 | 4 | 3 | 7 | 6 | 10 | 13 | 12 | 5 | 14 | 16 | 8 | 2 | 11 |
| Group 21 | 1 | 16 | 3 | 12 | 11 | 9 | 13 | 5 | 8 | 2 | 14 | 7 | 4 | 10 | 15 |
| Group 22 | 2 | 2 | 5 | 10 | 16 | 11 | 3 | 10 | 11 | 8 | 5 | 13 | 3 | 13 | 8 |
| Group 23 | 2 | 2 | 12 | 3 | 15 | 5 | 8 | 3 | 5 | 14 | 12 | 9 | 8 | 9 | 14 |
| Group 24 | 2 | 3 | 6 | 16 | 12 | 16 | 3 | 13 | 13 | 6 | 7 | 9 | 2 | 12 | 7 |
| Group 25 | 2 | 3 | 8 | 2 | 9 | 15 | 14 | 3 | 14 | 9 | 5 | 5 | 15 | 8 | 12 |
| Group 26 | 2 | 4 | 7 | 9 | 5 | 4 | 9 | 11 | 2 | 14 | 5 | 14 | 11 | 16 | 16 |
| Group 27 | 2 | 4 | 13 | 12 | 12 | 7 | 15 | 10 | 5 | 2 | 15 | 5 | 13 | 7 | 4 |
| Group 28 | 2 | 5 | 9 | 9 | 3 | 12 | 8 | 14 | 15 | 12 | 14 | 5 | 3 | 21 | 5 |
| Group 29 | 2 | 5 | 11 | 7 | 2 | 11 | 9 | 4 | 16 | 7 | 16 | 9 | 14 | 14 | 4 |
| Group 30 | 2 | 6 | 2 | 13 | 3 | 3 | 12 | 9 | 7 | 16 | 6 | 9 | 16 | 13 | 12 |
| Group 31 | 2 | 6 | 9 | 7 | 7 | 16 | 13 | 3 | 12 | 2 | 13 | 12 | 9 | 16 | 6 |
| Group 32 | 2 | 7 | 12 | 15 | 2 | 12 | 4 | 10 | 13 | 15 | 13 | 4 | 5 | 5 | 10 |
| Group 33 | 2 | 7 | 14 | 16 | 5 | 9 | 2 | 9 | 16 | 11 | 11 | 5 | 7 | 4 | 14 |
| Group 34 | 2 | 8 | 5 | 12 | 5 | 2 | 14 | 14 | 8 | 15 | 3 | 9 | 12 | 15 | 9 |
| Group 35 | 2 | 9 | 13 | 4 | 2 | 13 | 8 | 11 | 6 | 4 | 6 | 8 | 15 | 15 | 11 |
| Group 36 | 2 | 10 | 3 | 2 | 13 | 16 | 8 | 10 | 8 | 13 | 11 | 11 | 16 | 3 | 5 |
| Group 37 | 2 | 11 | 15 | 3 | 11 | 6 | 14 | 10 | 15 | 10 | 6 | 7 | 7 | 14 | 3 |
| Group 38 | 2 | 16 | 4 | 5 | 16 | 14 | 7 | 11 | 4 | 11 | 14 | 9 | 9 | 7 | 5 |
| Group 39 | 3 | 3 | 4 | 6 | 11 | 12 | 13 | 6 | 12 | 14 | 4 | 5 | 13 | 5 | 14 |
| Group 40 | 3 | 3 | 6 | 5 | 16 | 9 | 15 | 5 | 9 | 10 | 6 | 4 | 15 | 4 | 10 |
| Group 41 | 3 | 4 | 5 | 14 | 4 | 6 | 12 | 13 | 5 | 13 | 6 | 11 | 11 | 12 | 14 |
| Group 42 | 3 | 4 | 9 | 16 | 10 | 4 | 16 | 15 | 3 | 5 | 10 | 5 | 15 | 6 | 6 |
| Group 43 | 3 | 4 | 16 | 10 | 5 | 10 | 4 | 9 | 9 | 16 | 15 | 6 | 3 | 5 | 15 |

FIG. 7A

| Scrambling Code Group | slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 44 | 3 | 5 | 12 | 11 | 14 | 5 | 11 | 13 | 3 | 6 | 14 | 6 | 13 | 4 | 4 |
| Group 45 | 3 | 6 | 4 | 10 | 6 | 5 | 9 | 15 | 4 | 15 | 5 | 16 | 16 | 9 | 10 |
| Group 46 | 3 | 7 | 8 | 8 | 16 | 11 | 12 | 4 | 15 | 11 | 4 | 7 | 16 | 3 | 15 |
| Group 47 | 3 | 7 | 16 | 11 | 4 | 15 | 3 | 15 | 11 | 12 | 12 | 4 | 7 | 8 | 16 |
| Group 48 | 3 | 8 | 7 | 15 | 4 | 8 | 15 | 12 | 3 | 16 | 4 | 16 | 12 | 11 | 11 |
| Group 49 | 3 | 8 | 15 | 4 | 16 | 4 | 8 | 7 | 7 | 15 | 12 | 11 | 3 | 16 | 12 |
| Group 50 | 3 | 10 | 10 | 15 | 16 | 5 | 4 | 6 | 16 | 4 | 3 | 15 | 9 | 6 | 9 |
| Group 51 | 3 | 13 | 11 | 5 | 4 | 12 | 4 | 11 | 6 | 6 | 5 | 3 | 14 | 13 | 12 |
| Group 52 | 3 | 14 | 7 | 9 | 14 | 10 | 13 | 8 | 7 | 8 | 10 | 4 | 4 | 13 | 9 |
| Group 53 | 5 | 5 | 8 | 14 | 16 | 13 | 6 | 14 | 13 | 7 | 8 | 15 | 6 | 15 | 7 |
| Group 54 | 5 | 6 | 11 | 7 | 10 | 8 | 5 | 8 | 7 | 12 | 12 | 10 | 6 | 9 | 11 |
| Group 55 | 5 | 6 | 13 | 8 | 13 | 5 | 7 | 7 | 6 | 16 | 14 | 15 | 8 | 16 | 15 |
| Group 56 | 5 | 7 | 9 | 10 | 7 | 11 | 6 | 12 | 9 | 12 | 11 | 8 | 8 | 6 | 10 |
| Group 57 | 5 | 9 | 6 | 8 | 10 | 9 | 8 | 12 | 5 | 11 | 10 | 11 | 12 | 7 | 7 |
| Group 58 | 5 | 10 | 10 | 12 | 8 | 11 | 9 | 7 | 8 | 9 | 5 | 12 | 6 | 7 | 6 |
| Group 59 | 5 | 10 | 12 | 6 | 5 | 12 | 8 | 9 | 7 | 6 | 7 | 8 | 11 | 11 | 9 |
| Group 60 | 5 | 13 | 15 | 15 | 14 | 8 | 6 | 7 | 16 | 8 | 7 | 13 | 14 | 5 | 16 |
| Group 61 | 9 | 10 | 13 | 10 | 11 | 15 | 15 | 9 | 16 | 12 | 14 | 13 | 16 | 14 | 11 |
| Group 62 | 9 | 11 | 12 | 15 | 12 | 9 | 13 | 13 | 11 | 14 | 10 | 16 | 15 | 14 | 16 |
| Group 63 | 9 | 12 | 10 | 15 | 13 | 14 | 9 | 14 | 15 | 11 | 11 | 13 | 12 | 16 | 10 |

PHYSICAL LAYER STRUCTURES AND INITIAL ACCESS SCHEMES IN AN UNSYNCHRONIZED COMMUNICATION NETWORK

CROSS-REFERENCE TO RELATED APPLICATION

This application is a continuation of U.S. Ser. No. 10/760,424, filed Jan. 21, 2004, now U.S. Pat. No. 7,738,437, which claims the benefit under 35 U.S.C. §119(e) of U.S. Provisional Application Ser. No. 60/441,105, filed on Jan. 21, 2003, both of which are hereby incorporated by reference.

FIELD OF THE INVENTION

The invention relates to unsynchronized communication networks, and in particular to physical layer structures and access schemes for use in such networks.

BACKGROUND OF THE INVENTION

In OFDM (Orthogonal Frequency Division Multiplexing) wireless communication networks, data streams are typically transmitted in parallel using multiple orthogonal sub-carriers or tones within a single channel. The use of orthogonal sub-carriers allows the sub-carriers' spectra to overlap, thus achieving high spectrum efficiency. An OFDM system maps coded or modulated information symbols, QPSK (Quadrature Phase Shift Keying) or QAM (Quadrature Amplitude Modulation) symbols for instance, to sub-carriers in the frequency domain, and then generates a time domain signal for transmission using such a transformation technique as IFFT (Inverse Fast Fourier Transform). At a receiver, a time-to-frequency transformation, such as an FFT (Fast Fourier Transform), is used to convert a received time domain signal into the frequency domain. In order to recover transmitted source symbols correctly, the receiver aligns an FFT window with a corresponding IFFT window used at the transmitter and compensates for any frequency offset between the transmitter and the receiver.

Initial access to a communication network by a communication terminal involves a search operation to find available base stations and communication channels and a synchronization operation to synchronize the terminal to a base station. Dedicated physical channels, such as an initial access channel, a synchronization channel for timing and frequency synchronization, and a pilot channel to assist in channel estimation for coherent detection have been used for these operations, but increase communication signal overhead.

Other known network access techniques involve the insertion of a preamble or some other synchronization signal by a transmitter, at a predetermined location in a communication signal, and detection of the synchronization signal at a receiver. For synchronized communication networks, preambles from multiple base stations in the communication network are transmitted at the same time. Orthogonal preambles support efficient channel searching during initial access operations at a receiver. However, for asynchronous communication networks, synchronization signal transmissions from multiple base stations are not orthogonal, which degrades the performance of access algorithms based on synchronization signals. A further issue with preamble-based synchronization signal insertion schemes is that payload management may not be compatible with current standardized timing structures, such as the UTRAN (UMTS (Universal Mobile Telecommunication System) Terrestrial Radio Access Network) timing structure, i.e. the 3GPP ($3^{rd}$ Generation Partnership Project) TTI or transmit-time-interval. Specifically, the payload of a synchronization signal TTI would not be the same as the normal TTI.

SUMMARY OF THE INVENTION

According to an embodiment of the present invention, a method includes modulating access channel information onto at least one set of time-continuous signal components of a communication signal that has multiple of signal components, each set of time-continuous signal components having a respective common frequency, and transmitting the communication signal.

The access channel information preferably includes a common synchronization code associated with all transceiver stations in a communication network and a cell-specific synchronization code uniquely associated with one of the transceiver stations. Both codes are preferably modulated onto each of the at least one set of time-continuous signal components.

The communication signal may also include a scattered pilot channel onto which a portion of the access channel information, preferably the cell-specific synchronization code, is also modulated.

In a preferred embodiment, the communication signal is an OFDM signal. Each set of time-continuous signal components includes signal components carried by respective sub-carriers in multiple OFDM symbols, and the scattered pilot channel is preferably pair-wise scattered onto sub-carriers having a common sub-carrier index in pairs of consecutive OFDM symbols.

A method of accessing a communication network is provided in another embodiment of the invention. The method preferably includes receiving a communication signal having a number of sets of time-continuous signal components and searching for access channel information in at least one predetermined set of time-continuous signal components. Synchronization parameters are then determined based on a location of the access channel information in the at least one predetermined set of time-continuous signal components.

When the access channel information includes a common synchronization code and a cell-specific synchronization code, searching includes respective operations for searching for each code.

Searching for the common synchronization code preferably includes sampling the received communication signal, performing a time domain to frequency domain transformation using a transformation window starting at a start position to generate a frequency domain signal, extracting frequency domain data corresponding to the at least one predetermined set of time-continuous signal components from the frequency domain signal within a window having a length of a predetermined period, correlating the extracted data with the common synchronization code, moving the predetermined period-length window by a predetermined step size until a starting position of the predetermined period-length window has been moved a distance of at least the predetermined period, and repeating the extracting and correlating for each position of the predetermined period-length window. Peak correlation values indicate occurrences of the common synchronization code and therefore the location of the first symbol in each frame.

For each synchronization parameter determined on the basis of the common synchronization code, cell-specific searching preferably includes performing the time domain to frequency domain transformation using the coarse timing position estimate as the transformation start window position, extracting frequency domain data corresponding to the at least one predetermined set of time-continuous signal components from the frequency domain signal, starting from the candidate frame boundaries obtained from common synchronization code searching based frame synchronization step, correlating the extracted data with each of the cell-specific synchronization codes, and determining peak correlation values indicating occurrences of one of the cell-specific synchronization codes.

A coarse timing position estimate is determined in some embodiments by moving the transformation window by a transformation window step size until a starting position of the transformation window has been moved a distance of at least the symbol length, and for each position of the transformation window, repeating the performing, extracting, correlating with the common synchronization code, moving the predetermined period-length window, repeating the extracting and correlating, and determining peak correlation values.

A method according to a still further embodiment of the invention includes modulating a cell-specific synchronization code uniquely associated with one a base transceiver station in a communication network onto a scattered pilot channel carried by predetermined pilot channel sub-carriers of a communication signal and transmitting the communication signal. At a receiving end, a communication terminal extracts data from the scattered pilot channel, correlates with the cell-specific synchronization code, and to do base transceiver station identification checking. It can also performs fine timing and frequency synchronization operations based on the scattered pilots. The cell-specific synchronization code may also be modulated onto one or more sets of time-continuous signal components in the communication signal, preferably along with a common synchronization code associated with all base transceiver stations in the communication network.

In some embodiments of the invention, a computer-readable medium stores instruction which, when executed by a processor, perform any of these methods.

According to yet another embodiment of the invention, a physical layer structure for communication signals includes symbols having signal components carried by respective sub-carriers and an initial access channel for carrying a synchronization code for use in synchronization operations at a communication terminal. The initial access channel is mapped to a time-continuous set of the signal components, the time-continuous set of signal components including signal components from multiple symbols carried by at least one of the sub-carriers.

A base transceiver station in a communication network, according to a further embodiment of the invention, includes a processor configured to map a synchronization channel to a set of time-continuous signal components in a communication signal and an output configured to transmit the communication signal.

In a related embodiment, a communication terminal includes an input configured to receive a communication signal having signal components carried by respective sub-carriers and a processor configured to search for synchronization channel information in predetermined time-continuous sets of the signal components carried by respective ones of the plurality of sub-carriers and to determine synchronization parameters based on a location of the synchronization channel information in the predetermined time-continuous sets of the signal components.

Another embodiment of the present invention provides a communication network. Each of a number of base transceiver stations in the network modulates access channel information onto at least one set of time-continuous signal components of a communication signal, each set of time-continuous signal components having a respective common frequency and transmits the communication signal to communication terminals configured for operation in the communication network. The communication terminals search for the access channel information in the plurality of sets of time-continuous signal components and determine synchronization parameters based on a location of the access channel information in the plurality of sets of time-continuous signal components.

Other aspects and features of the present invention will become apparent to those ordinarily skilled in the art upon review of the following description of the specific embodiments of the invention.

BRIEF DESCRIPTION OF THE DRAWINGS

The invention will now be described in greater detail with reference to the accompanying diagrams, in which:

FIGS. 7(a) and 7(b) together form a table showing an example allocation of SSCs (Secondary Synchronization Codes) for secondary SCE (Synchronization Channel) sequences;

DETAILED DESCRIPTION OF THE PREFERRED EMBODIMENTS

Figure 1:
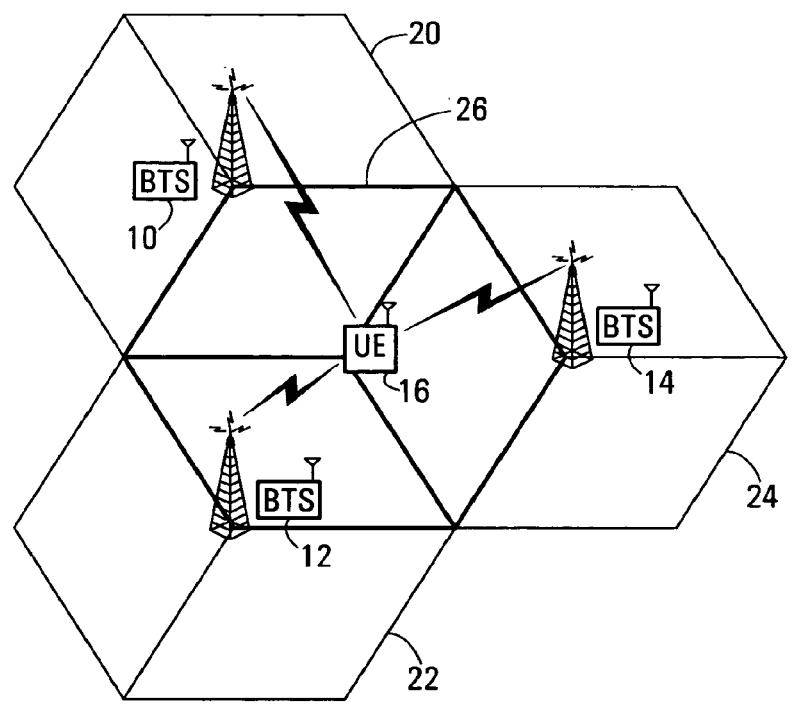
FIG. 1 is a block diagram of a wireless communication network.

FIG. 1 is a block diagram of a wireless communication network. The communication network includes base transceiver stations (BTSs) 10, 12, 14, which provide communication network coverage to respective coverage areas or "cells" 20, 22, 24. User equipment (UE) 16 is adapted to communicate with any of the BTSs 10, 12, 14 that are within its range, represented at 26.

Those skilled in the art will appreciate that the communication network shown in FIG. 1 is intended solely for illustrative purposes, and that a communication network may include further or different components than those explicitly shown in FIG. 1. For example, most communication networks include more than three BTSs and provide communication services for many UEs. Such communication networks are also normally connected to other types of networks, including landline telephone networks, for instance. It should be further appreciated that BTS coverage areas and UE ranges are not normally hexagonal.

Each BTS 10, 12, 14 preferably includes a transceiver, or alternatively a separate transmitter and receiver, for sending communication signals to and receiving communication signals from the UE 16 via an antenna system. An antenna system at a BTS may include a single antenna or a multiple antennas, such as in an antenna array, for example. The BTSs 10, 12, 14 may also communicate with each other, and with other communication stations or components, including components in other communication networks, through wireless or wired communication links. Communication functions of the BTSs may involve such operations as modulation and demodulation, coding and decoding, filtering, amplification, and frequency conversion. These and possibly other signal processing operations are preferably performed in the BTSs by digital signal processors (DSPs) or general-purpose processors that execute signal processing software.

The UE 16 is a wireless communication device such as a data communication device, a voice communication device, a multiple-mode communication device that supports data, voice, and possibly further communication functions, or a wireless modem that operates in conjunction with a computer system. The UE 16 receives communication signals from and preferably also sends communication signals to the BTSs 10, 12, 14 through a transceiver or a receiver and a transmitter, and an antenna system that may include a single antenna or multiple antennas. As in the BTSs 10, 12, 14, such signal processing operations as modulation and demodulation, coding and decoding, filtering, amplification, and frequency conversion are preferably performed by a DSP or general-purpose processor in the UE 16.

Communication signals between BTSs and UEs in a communication network are formatted according to a particular protocol or communication scheme for which the communication network is adapted. Such signal formats are also commonly referred to as physical layer structures.

Known physical layer structures for the above example of OFDM communications include those used in DAB (Digital Audio Broadcasting) and DVB-T (Digital Video Broadcasting-Terrestrial), and communication networks based on the IEEE 802.11a and 802.16a standards.

DAB and DVB-T are used for audio and video terrestrial broadcasting. Each broadcast station inserts symbol prefixes before each OFDM symbol and transmits the same signal as other broadcast stations as a simulcast. Most synchronization methods adopted by DAB and DVB-T systems are based on the repetition structure introduced by cyclic prefix insertion. As those skilled in the art will appreciate, prefix-based initial access schemes are generally used only when fast network access is not critical. Normally, DAB and DVB-T are also applied in single frequency synchronized networks. In this case, interference from neighboring broadcast stations is treated as an active echo, which can be handled by the proper design of the OFDM symbol prefix.

IEEE 802.11a and 802.16a refer to sets of specifications, available from the IEEE (Institute of Electrical and Electronics Engineers) relating to OFDM wireless networks. These specifications respectively describe packet-based OFDM systems with and without a preamble header. However, these systems are designed for a single cell, single BTS point-to-multi-point transmission in fixed wireless networks.

Figure 2:
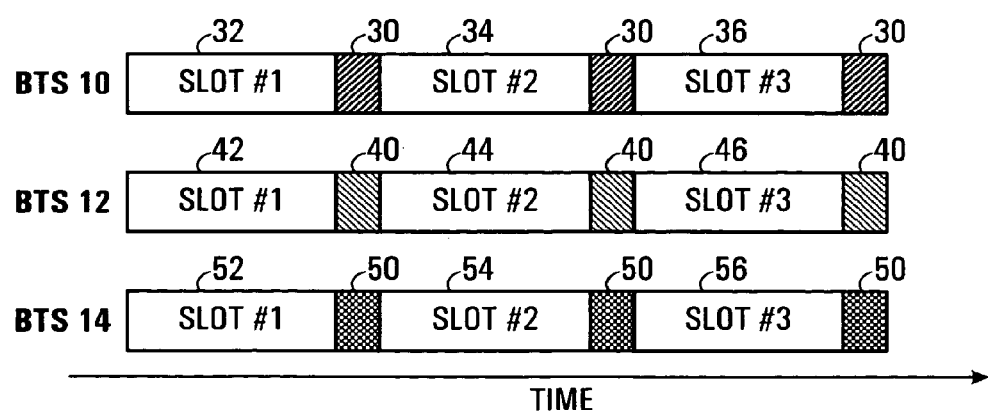
FIG. 2 illustrates a known physical layer structure for a synchronized communication network.

Another conventional downlink (BTS to UE) point-to-multi-point physical layer structure for OFDM communication signals includes frames that contain time slots, with each time slot containing a number of symbols. FIG. 2 illustrates such a physical layer structure for a synchronized communication network. In this structure, each BTS 10, 12, 14 uses the same band of frequencies (i.e., frequency re-use is 1), and a data stream from each BTS 10, 12, 14 is organized into time slots which form frames. Each time slot 32, 34, 36, 42, 44, 46, 52, 54, 56 contains a preamble header 30, 40, 50 followed by traffic data symbols. In FIG. 2, three time slots are shown for each of the BTSs 10, 12, 14. For the BTS 10, for example, each of the three time slots 32, 34, 36 includes the same preamble 30 associated with the BTS 10. Similar time slots are shown for the other BTSs 12, 14. In a synchronized network, the frames and time slots and thus the preambles from each BTS are aligned.

Figure 3:
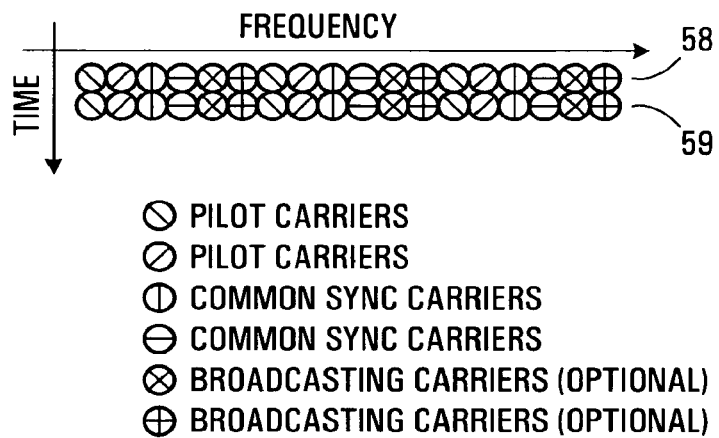
FIG. 3 is a time-frequency representation of an example preamble structure for a synchronized communication network.

FIG. 3 is a time-frequency representation of an example preamble structure for a synchronized communication network. The preamble includes training signals transmitted over pilot and synchronization sub-carriers, and optionally, broadcasting sub-carriers to reduce overhead. In the structure of FIG. 3, the preamble occupies two symbols 58 and 59. Data is transmitted following the preamble, as well as in the broadcasting sub-carriers, if present. Those skilled in the art will be familiar with these types of training signals and their use in communication networks.

The use of a unique orthogonal preamble for each BTS 10, 12, 14 in a synchronized network allows the UE 16 to perform at least fundamental access operations. Orthogonal preambles are generally preferred, to provide for a fast search operation during initial network access. As each BTS has its own unique corresponding preamble, detection of a preamble allows a UE to identify a BTS. In addition, a preamble includes a sequence that is known to UEs, such that preambles further provide for relatively fast determination of channel quality in terms of a C/I (carrier to interference) ratio, for example, as well as frame and timing synchronization, frequency and timing offset estimation, and initial channel estimation, in accordance with known techniques.

Figure 4:
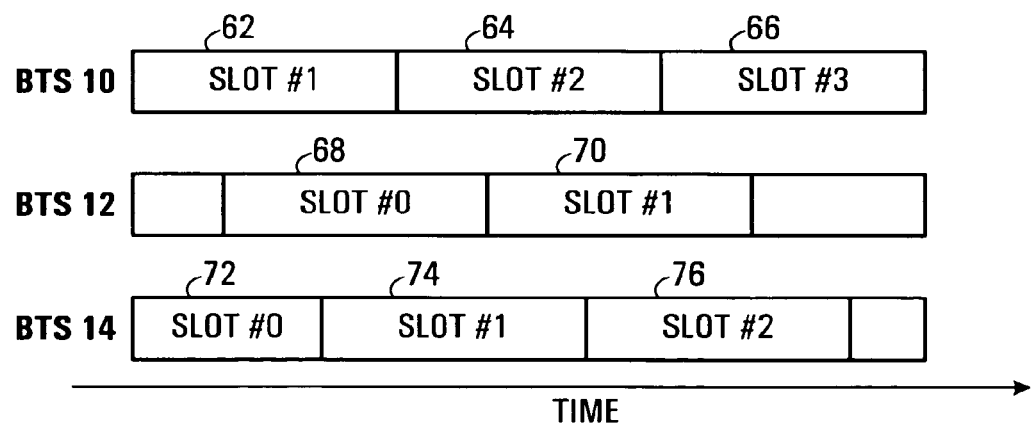
FIG. 4 illustrates a physical layer structure for an unsynchronized communication network.

FIG. 4 illustrates a physical layer structure for an unsynchronized communication network. As shown, in unsynchronized or asynchronous communication networks, the frame boundaries and thus the time slots 62, 64, 66 of the BTS 10 do not align with the time slots 68, 70 from the BTS 12 or the time slots 72, 74, 76 from the BTS 14. Preambles inserted into these time slots according to the techniques described above with reference to FIG. 2 would not be orthogonal, thereby degrading the performance of preamble-based algorithms. As described above, payload management associated with preamble insertion may also be incompatible with the current UTRAN timing structure, the 3GPP TTI.

In accordance with one embodiment this invention, a new design of a physical layer structure that is not limited to synchronous networks is provided. A new common channel provides training information that is typically provided in multiple training channels to enable high performance initial access and synchronization algorithms while introducing very low overhead into communication signals.

Figure 5:
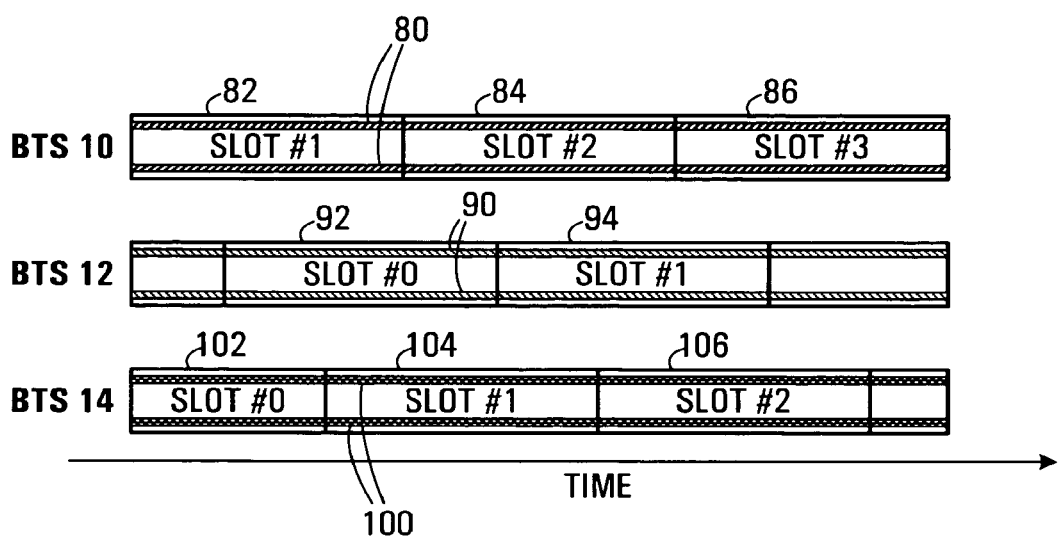
FIG. 5 illustrates a physical layer structure in accordance with an embodiment of the invention.

FIG. 5 illustrates a physical layer structure in accordance with an embodiment of the invention. Each BTS 10, 12, 14 uses the same frequency band which preferably includes a plurality of sub-carriers. Although the BTS data streams are separated in FIG. 5 for clarity, it should be appreciated that each BTS 10, 12, 14 preferably uses the same frequency band.

The time slots 82, 84, 86, 92, 94, 102, 104, 106 preferably include a plurality of symbols, such as OFDM symbols. Each symbol includes a set of time domain samples transferred from a group of frequency domain data through a frequency to time domain transformation such as an IFFT, as described above. OFDM symbols may be considered a plurality of signal components, each carried by respective a sub-carrier. Each symbol includes respective signal components carried by the same plurality of sub-carriers. Thus any sub-carrier, corresponding to a single frequency, carries a set of time-continuous signal components from a plurality of symbols.

A common initial access channel (IACH) 80, 90, 100 is mapped distinctly to at least one such set of time-continuous signal components, from a plurality of symbols included in the time slots 82, 84, 86, 92, 94, 102, 104, 106. FIG. 5 shows a mapping of the IACH 80, 90, 100 to two sets of time-continuous signal components, although mapping to fewer or further sets is also contemplated. The IACH is used for one or more of initial access, synchronization, base station identification, and channel estimation, as described in further detail below.

It should be appreciated that references to time-continuous signal components are not intended to indicate absolute and perpetual time continuity. For example, communication signal processing is typically implemented digitally, using communication signal samples. Furthermore, a set of signal components carrying IACH information may be continuous only over some of the symbols in a time slot or frame, or preferably an entire frame. The IACH might not be transmitted in certain types of frame or when a BTS is idle (i.e., not transmitting communication signals), for instance.

In the case of preambles, training channels are mapped along the frequency direction in a time-frequency plane, as shown in FIG. 3. However, according to an embodiment of the invention, the IACH 80, 90, 100 for each BTS 10, 12, 14 is mapped along the time direction. In a preferred embodiment, the IACH 80, 90, 100 is allocated on the same frequency or sub-carrier index, which is associated with the frequency or sub-carrier for the set of time-continuous signal components to which the IACH is mapped, for all of the BTSs 10, 12, 14. For example, where the BTSs 10, 12, 14 are assigned a frequency band including 10 sub-carriers, the IACH 80, 90, 100 may be mapped to the $3^{rd}$ and $7^{th}$ sub-carriers for each BTS 10, 12, 14. This design introduces very low overhead, but provides enough training information to support high performance algorithms.

Advantageously, embodiments of the invention can be optimized for unsynchronized communication networks. In some embodiments, overhead introduced by the training channels is evenly distributed in each OFDM symbol. Some embodiments are more robust and involve less complicated frequency domain BTS acquisition without the initial rough knowledge of frame boundaries or symbol boundaries.

The initial access channel (IACH) 80, 90, 100 is an initial acquisition channel for a mobile terminal such as the UE 16 of FIG. 1 to access a communication network. For an asynchronous system, several sub-carriers having the same frequency index are preferably allocated for the IACH. A common synchronization code is then preferably mapped onto the IACH. The common synchronization code includes a complex pseudo-noise (PN) sequence that is known to all mobile terminals and used by all BTSs to modulate the IACH sub-carriers. The same IACH mapping structure is preferably employed across an entire communication network. A further cell-specific synchronization code that is unique to each BTS may also be mapped onto the IACH. In a preferred embodiment, the common and cell-specific codes are orthogonal and overlap. Each code, by virtue of its orthogonality with the other code, can then be detected by correlation, for example, as described in further detail below.

In order to access a network in which the above IACH and synchronization codes are implemented, a mobile terminal first performs a network search by synchronizing to the common synchronization code to establish the correct timing and frame/slot synchronization, and then performs a cell search for the cell-specific synchronization code to lock onto a serving BTS.

For OFDM systems, frequency domain acquisition algorithms are generally more accurate than time domain algorithms because of the embedded orthogonality property of frequency domain multiplexing. However, in order to extract the frequency domain sub-carriers, FFT computing or some other frequency domain transformation is required. Therefore, an initial acquisition step of coarse timing synchronization is typically performed in the time domain prior to the FFT operation. A cyclic prefix may be employed to perform the coarse timing acquisition. On the other hand, the performance of cyclic prefix-based acquisition is poor for short prefix lengths, and for low C/I ratios. Another issue associated with prefix-based acquisition is that frame synchronization cannot be realized jointly with coarse timing acquisition.

The distribution of the IACH along the time direction in accordance with an embodiment of the invention allows terminals to perform frame synchronization and coarse timing synchronization, as well as BTS identification. Such an IACH can support low complexity frequency domain initial access acquisition algorithms even without the assistance of time domain coarse timing synchronization. Initial access methods employing the IACH are described in detail below.

In another embodiment of the invention, a scattered pilot channel is also provided and used in synchronization operations. For OFDM mobile communications systems, scattered pilot channels are typically used to estimate the propagation channel to support coherent detection of a communication signal at a receiver. In this embodiment of the invention, either the common synchronization code or preferably the cell-specific synchronization code is mapped onto a scattered pilot channel. Mapping of the cell-specific synchronization code to the pilot channel effectively re-uses the pilot channel for BTS identification, fine timing synchronization, and frequency offset tracking, in addition to channel estimation.

As described above, only one common synchronization code is used by all BTSs in a communication network, whereas a plurality of unique cell-specific synchronization code, one per BTS, are used in the network. As the number of the pilot channel sub-carriers is normally greater than the IACH sub-carriers, the longer cell-specific synchronization codes, or a repetition of the cell-specific synchronization codes if necessary, are preferably applied to the pilot channel.

The positioning of scattered pilot sub-channels is preferably cyclically shifted between adjacent BTSs. Power boosted transmission may also be used for the scattered pilot channel. The relationship between a BTS and a scattered pilot sub-carrier pattern is preferably fixed, such that once a BTS has been identified, the scattered pilot sub-carrier pattern for that BTS is also known or can be determined by a UE.

In addition to channel estimation, scattered pilot channels are re-used for fine timing synchronization and frequency synchronization in embodiments of the present invention. In one embodiment, this is facilitated by assigning the scattered pilot channel to sub-carriers having indexes that are the same for pairs of consecutive OFDM symbols. A pair-wise scattered pilot channel sub-carrier pattern not only allows the re-use of the pilot channel for frequency synchronization or offset tracking, but may also supports MIMO (Multiple Input Multiple Output) systems. Re-use of the pilot channel for frequency synchronization or offset tracking reduces communication signal overhead, in that conventional techniques employ a plurality of training channels for channel estimation and synchronization in time and frequency.

Figure 6:
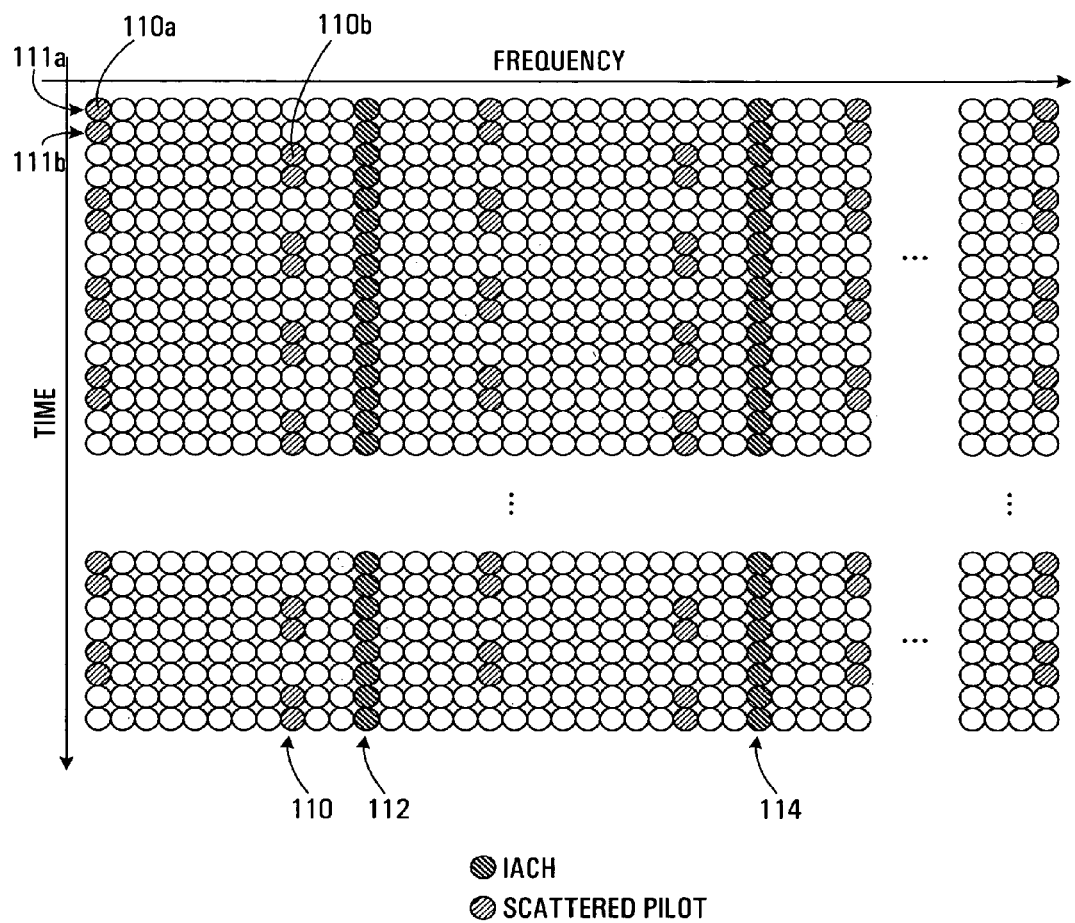
FIG. 6 shows an initial access channel and scattered pilot channel sub-carrier pattern according to an embodiment of the invention on a time-frequency plane.

FIG. 6 shows an initial access channel and scattered pilot channel sub-carrier pattern according to an embodiment of the invention, for an OFDM communication network. Each row represents an OFDM symbol, and each column represents a set of sub-carriers having a common frequency index. Thus, each circle in FIG. 6 represents a signal component, carried by a particular sub-carrier, of a symbol.

In the illustrative example of FIG. 6, the pilot channel 110 is pair-wise scattered onto sub-carriers having the same index in pairs of consecutive symbols. The pilot channel sub-carrier pair 110a includes sub-carriers that have the same frequency index in the consecutive symbols 111a and 111b. Similarly, the pilot channel sub-carrier pair 110b includes sub-carriers that have another common index in the next consecutive pair of symbols. The IACH is mapped to multiple sets 112, 114 of time-continuous signal components from a plurality of symbols.

The spacing between IACH sub-carriers and the spacing between pilot sub-carriers is also chosen as a power of 2 in the example embodiment of FIG. 6. This spacing enables application of a faster pilot channel extraction algorithm, for example by performing partial FFTs.

The combination of the common synchronization code and the cell-specific synchronization code may be considered a synchronization sequence. The two codes of the synchronization sequence may be mapped to the IACH, and one of the codes, preferably the cell-specific synchronization code, may also be mapped to the scattered pilot channel, as described above. In one embodiment of the invention, the common synchronization code is mapped to the IACH, whereas the cell-specific code is mapped to the IACH as well as the scattered pilot channel. It will be obvious to those skilled in the art that this is one example code-to-channel mapping, and that the invention is in no way limited thereto.

The present invention is similarly not limited to synchronization channel information having two constituent codes or types of codes. For example, the techniques described herein for mapping common synchronization codes and cell-specific synchronization codes onto the IACH and scattered pilot channel may be extended to other types of synchronization channel information, such as 3GPP synchronization channel information. In accordance with embodiments of the invention, such a synchronization channel is mapped onto a physical layer structure for asynchronous communication networks.

In the context of the 3GPP synchronization channel, 3GPP PSCs (primary synchronization codes) and SSCs (secondary synchronization codes), which may be used by more than one BTS, are forms of the common synchronization code. As each BTS has one and only one unique primary scrambling code, the scrambling code is a form of the cell-specific synchronization code. The PSC is used to acquire slot timing, the SSC is used to acquire frame timing, and the scrambling code is used to acquire a connection with a particular BTS. The generation of 3GPP scrambling codes and synchronization codes is known and is therefore described only briefly herein.

A total of $2^{18}-1=262,143$ scrambling codes, numbered 0 ... 262,142 can be generated using $18^{th}$ order generator polynomials, for example. However, not all of these scrambling codes are used according to 3GPP specifications. The scrambling codes are divided into 512 sets of 15 secondary scrambling codes, with each set corresponding to one of 512 primary scrambling codes. Each BTS is allocated one and only one primary scrambling code.

Scrambling codes are constructed by combining two real sequences into a complex sequence. Each of the two real sequences is constructed as the position-wise modulo 2 sum of 38400 chip segments of two binary m-sequences generated by means of two generator polynomials of degree 18. The resulting sequences thus constitute segments of a set of Gold sequences. The scrambling codes are repeated for every 10 ms radio frame. If x and y are the two sequences, the x sequence is preferably constructed using the primitive (over GF(2)) polynomial $1+X^7-X^{18}$ and the y sequence is preferably constructed using the polynomial $1+X^5+X^7+X^{10}+X^{18}$.

The primary scrambling codes include scrambling codes n=16*i where i=0 ... 511. The $i^{th}$ set of secondary scrambling codes consists of scrambling codes 16*i+k, where k=1 ... 15. Each primary scrambling code is thus associated with 15 secondary scrambling codes, such that the $i^{th}$ primary scrambling code corresponds to the $i^{th}$ set of secondary scrambling codes.

Hence, according to the above, scrambling codes 0, 1, ... , 8191 are typically used. Each of these codes is associated with a left alternative scrambling code and a right alternative scrambling code that may be used for compressed frames. The left alternative scrambling code corresponding to scrambling code k is scrambling code number k+8192, while the right alternative scrambling code corresponding to scrambling code k is scrambling code number k+16384. For compressed frames, the left alternative scrambling code is used if n<SF/2 and the right alternative scrambling code is used if n≥SF/2, where $c_{ch,SF,n}$ is the channelization code used for non-compressed frames. The usage of alternative scrambling codes for compressed frames is respectively signalled by higher layers for each physical channel.

The set of 512 primary scrambling codes is further divided into 64 scrambling code groups, each consisting of 8 primary scrambling codes. The $j^{th}$ scrambling code group consists of primary scrambling codes 16*8*j+16*l, where j=0 ... 63 and l=0..7.

Each BTS is allocated one and only one primary scrambling code. The P-CCPCH (Primary Common Control Physical Channel), primary CPICH (Common Pilot Channel), PICH (Page Indication Channel), AICH (Acquisition Indication Channel), AP-AICH (Access Preamble AICH), CD/CA-ICH (Collision Detection/Channel Assignment Indication Channel), CSICH (Common Packet Channel (CPCH) Status Indicator Channel) and S-CCPCH (Secondary CCPCH), for example, are transmitted using the primary scrambling code. Other downlink physical channels can be transmitted with either the primary scrambling code or a secondary scrambling code from the set associated with the primary scrambling code of the BTS. A mixture of primary scrambling code and secondary scrambling code for one CCTrCH (Coded Composite Transport Channel) is allowable. However, in the case of the CCTrCH of type DSCH (Downlink Shared Channel), all the PDSCH (Physical DSCH) channelization codes that a single terminal may receive shall then be under a single scrambling code, either the primary or a secondary scrambling code.

The scrambling code associated with a scrambling code number n is denoted $z_n$. When $x(i)$, $y(i)$ and $z_n(i)$ denote the $i^{th}$ symbols of the sequences x, y, and $z_n$, respectively, the m-sequences x and y are constructed using the following initial conditions:

x is constructed with $x(0)=1$, $x(1)=x(2)= \ldots =x(16)=x(17)=0$;

$y(0)=y(1)= \ldots =y(16)=y(17)=1$, and a recursive definition of subsequent symbols as:

$x(i+18)=x(i+7)+x(i)$ modulo 2, $i=0, \ldots, 2^{18}-20$;

$y(i+18)=y(i+10)+y(i+7)+y(i+5)+y(i)$ modulo 2, $i=0, \ldots, 2^{18}-20$.

The $n^{th}$ Gold code sequence $z_n$, $n=0, 1, 2, \ldots, 2^{18}-2$, is then defined as:

$z_n(i)=x((i+n)$ modulo $(2^{18}-1))+y(i)$ modulo 2, $i=0, \ldots, 2^{18}-2$.

These binary sequences are then converted to real valued sequences $Z_n$ by the following transformation:

$$Z_n(i) = \begin{cases} +1 & \text{if } z_n(i) = 0 \\ -1 & \text{if } z_n(i) = 1 \end{cases} \text{ for } i = 0, 1, \ldots, 2^{18} - 2.$$

Finally, the $n^{th}$ complex scrambling code sequence $S_{dl,n}$ is defined as:

$S_{dl,n}(i)=Z_n(i)+jZ_n((i+131072)$ modulo $(2^{18}-1))$, $i=0, 1, \ldots, 38399$.

Note that the pattern from phase 0 up to the phase of 38399 is repeated.

Turning now to synchronization codes, the PSC, also denoted $C_{psc}$, is constructed as a so-called generalized hierarchical Golay sequence. The PSC is furthermore chosen to have good aperiodic autocorrelation properties, which allow for detection of the PSC at a receiver.

$$\text{Let } a = <x_1, x_2, x_3, \ldots, x_{16}>$$
$$= <1, 1, 1, 1, 1, 1, -1, -1, 1, -1, 1, -1, -1, -1, -1, 1>.$$

The PSC is generated by repeating the sequence a modulated by a Golay complementary sequence, and creating a complex-valued sequence with identical real and imaginary components. The PSC $C_{psc}$ is defined as:

$C_{psc}=(1+j)\times<a, a, a, -a, -a, a, -a, -a, a, a, a, -a, a, -a, a, a>$, where the leftmost chip in the sequence corresponds to the chip transmitted first in time.

Each code in a set of 16 SSCs $\{C_{ssc,1}, \ldots, C_{ssc,16}\}$, is also complex-valued with identical real and imaginary components, and are constructed from position-wise multiplication of a Hadamard sequence and a sequence d, defined as:

$d=<b, b, b, -b, b, b, -b, -b, b, -b, b, -b, -b, -b, -b, -b>$, where $b=<x_1, x_2, x_3, x_4, x_5, x_6, x_7, x_8, -x_9, -x_{10}, -x_{11}, -x_{12}, -x_{13}, -x_{14}, -x_{15}, -x_{16}>$ and $x_1, x_2, \ldots, x_{15}, x_{16}$, are the same as in the sequence a above.

The Hadamard sequences are obtained as the rows in a matrix $H_8$ constructed recursively by:

$$H_0 = (1)$$

$$H_k = \begin{pmatrix} H_{k-1} & H_{k-1} \\ H_{k-1} & -H_{k-1} \end{pmatrix}, k \geq 1,$$

with the rows numbered from the top starting with row 0 (the all ones sequence).

Denoting the $n^{th}$ Hadamard sequence as a row of $H_8$ numbered from the top, $n=0, 1, 2, \ldots, 255$, and $h_n(i)$ and $d(i)$ denote the $i^{th}$ symbols of the sequences $h_n$ and d, respectively, where $i=0, 1, 2, \ldots, 255$ and $i=0$ corresponds to the leftmost symbol, the $k^{th}$ SSC, $C_{ssc,k}$, $k=1, 2, 3, \ldots, 16$ is then defined as:

$$C_{ssc,k}=(1+j)\times<h_m(0)\times d(0), h_m(1)\times d(1), h_m(2)\times d(2), \ldots, h_m(255)\times d(255)>,$$

where $m=16\times(k-1)$ and the leftmost chip in the sequence corresponds to the chip transmitted first in time.

In 3GPP, a 10 ms radio frame includes 15 time slots. The PSC and an SSC are transmitted in parallel in each time slot. Although the PSC is the same for every BTS in a communication network and is transmitted in every time slot, the SSCs in each time slot need not be the same. A set of 64 sequences of 15 of the 16 SSCs is constructed such that their cyclic shifts are unique, i.e., a non-zero cyclic shift less than 15 of any of the 64 sequences is not equivalent to some cyclic shift of any other of the 64 sequences. Also, a non-zero cyclic shift less than 15 of any one of the sequences is not equivalent to itself with any other cyclic shift less than 15. The 64 sequences, also commonly referred to as secondary synchronization channel (SCE) sequences, are uniquely associated with one of the 64 groups of primary scrambling codes. The 15 SSCs of a secondary SCE sequence are respectively transmitted in the 15 time slots of the radio frame.

FIGS. 7(a) and 7(b) together form a table showing an example allocation of SSCs for secondary SCE sequences to encode the 64 different scrambling code groups. The entries in the table denote which SSCs to use in the different slots depending upon the scrambling code group to which the primary scrambling code of a BTS belongs. For example, the entry "7" means that SSC $C_{ssc,7}$ shall be used for the corresponding scrambling code group and slot, such as in slots 11 and 13 when the primary scrambling code belongs to scrambling code group 0.

Although 3GPP synchronization codes and scrambling codes are known to those skilled in the art to which the present invention pertains, the mapping of such codes for unsynchronized communication networks in accordance with embodiments of the invention is novel. It should also be appreciated that the above represents an example of code generation. The present invention is in no way limited thereto.

Figure 8:
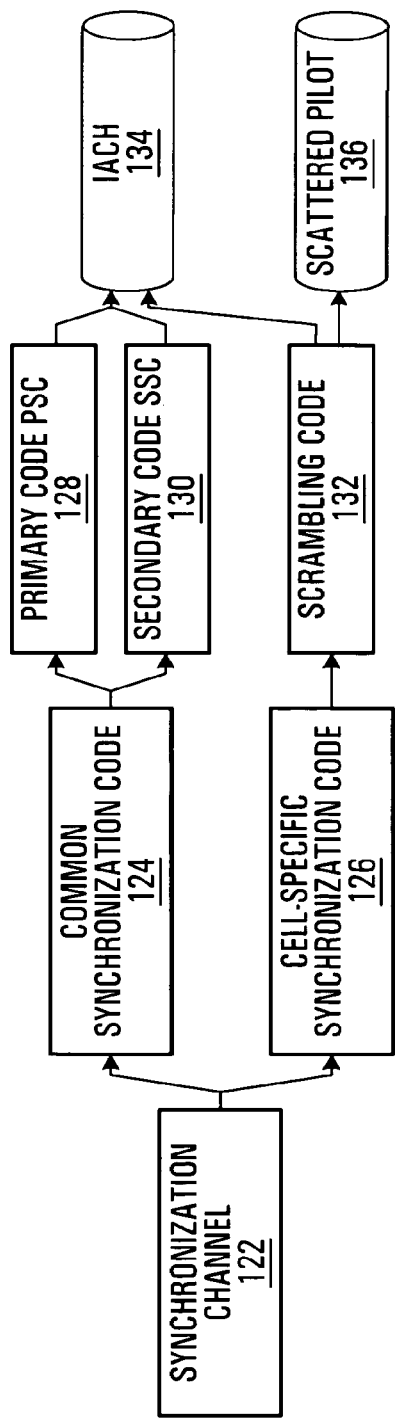
FIG. 8 is a block diagram showing a mapping between a synchronization channel and OFDM symbols in accordance with an embodiment of the invention.
Figure 9:
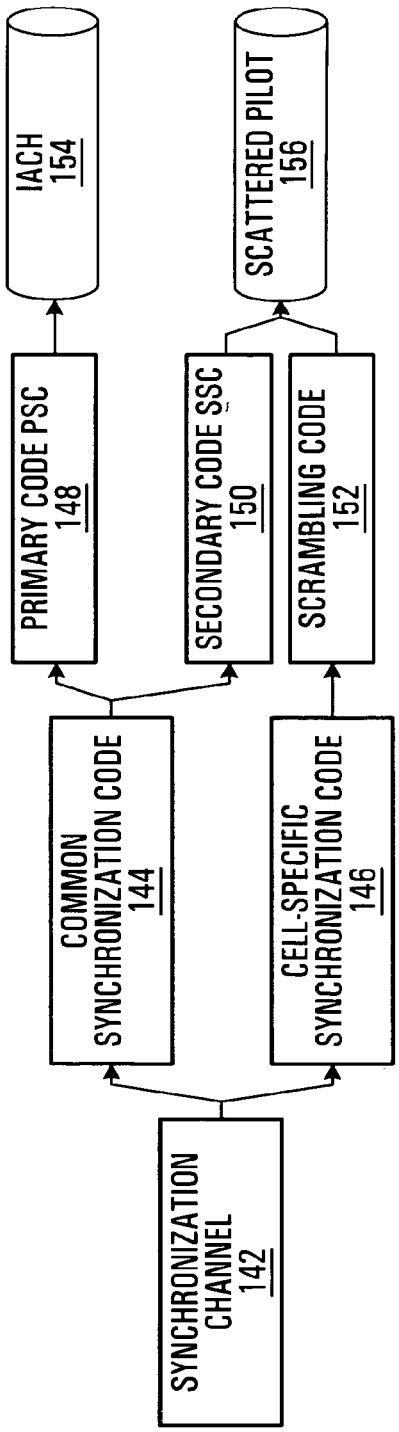
FIG. 9 is a block diagram showing a mapping between a synchronization channel and OFDM symbols in accordance with a further embodiment of the invention.

FIGS. 8 and 9 are block diagrams showing examples of mappings between a synchronization channel and OFDM symbols in accordance with embodiments of the invention. In FIGS. 8 and 9, 3GPP synchronization channels are mapped onto the logical synchronization channel structure and physical layer structure described above.

In the mapping of FIG. 8, the PSC 128 and the SSC 130 are mapped to the common synchronization code 124 of the logical synchronization channel 122, and to the IACH 134. Referring to FIG. 6, the PSC 128 and the SSC 130 may be mapped to respective components 112 and 114 of the IACH, for example. The scrambling code 132, which may be a primary scrambling code or a secondary scrambling code, for example, is mapped to the cell-specific synchronization code 126, and a portion of the scrambling code 132 is mapped to each of the IACH 134 and the scattered pilot channel 136. Alternatively, the entire scrambling code 132 could be mapped to the scattered pilot channel 136. The overhead of the IACH in the mapping shown in FIG. 8 is approximately 8-10%.

A further alternative mapping is shown in FIG. 9, in which the logical channel mapping of the PSC 148, the SSC 150, and the scrambling code 152 to the common synchronization code 144 and the cell-specific synchronization code 146 of the synchronization channel 142 is similar to that of FIG. 8, although mapping to the physical layer is different. In FIG. 9, the PSC 148 is mapped to the IACH 154, whereas the SSC 150 and the scrambling code 152 are mapped to the scattered pilot channel 156. In this case the IACH overhead is roughly 4%.

Optimization of network acquisition performance, i.e. acquisition time and success rate, trades off the overhead introduced by the IACH. Generally, acquisition performance improves as overhead is increased.

Figure 10:
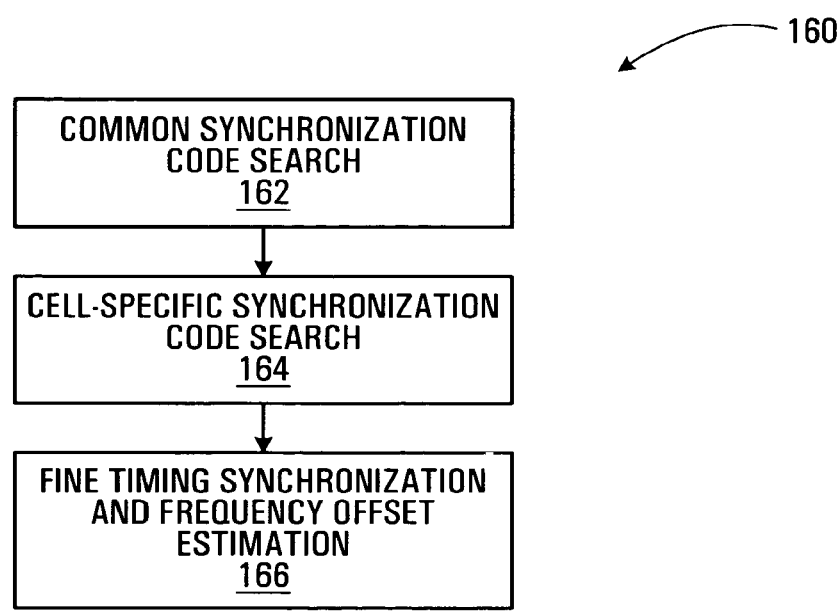
FIG. 10 is a flow chart illustrating an initial access method according to an embodiment of the invention.

One example of an initial access method based on the physical layer structure proposed herein is illustrated in FIG. 10. In the method 160, the first task 162 is to perform a search for a common synchronization code to achieve correct frame and slot timing.

According to one embodiment of the invention adapted for OFDM communications, a time domain to frequency domain transformation, illustratively an FFT, is performed on a received communication signal at a start position or sample index. In a multiple-BTS network, the received communication signal may include signals transmitted from different BTSs. The FFT start position is preferably determined from an initial coarse timing estimate, which may be generated using a time domain algorithm such as a prefix-based time domain estimation algorithm, for instance.

IACH sub-carriers from within a window preferably having a length of one frame are then sampled, in the frequency domain, to extract an IACH vector. For 3GPP, a radio frame has a length of 10 ms. As described above, the common synchronization code for a communication network is a PN sequence that is known to communication terminals configured to operate within the network. The extracted IACH vector is correlated with the known PN sequence corresponding to the common synchronization code.

The frame window is then moved a distance of one OFDM symbol at a time, the IACH sub-carriers within the relocated frame window are extracted, and the extracted IACH vector is correlated with the common synchronization code. This process of moving the frame window, extracting the IACH sub-carriers, and correlating the extracted IACH vector with the common synchronization code is preferably repeated until the frame window has scanned all of the OFDM symbols within one frame period.

Peaks in the resultant correlation pattern, or the locations of peaks with correlation values above a predetermined threshold, within one frame period are indicative of correct alignment of the frame window for detection of the common synchronization code from one of a plurality of BTSs. OFDM symbols at positions corresponding to these peaks are candidate first OFDM symbols in frames transmitted from the strongest adjacent BTSs. In one embodiment of the invention, frame window positions and correlation values are tracked using OFDM symbol offset indexes, and the offset indexes associated with the correlation peaks are then used to identify the corresponding first OFDM symbols.

The above common synchronization code search scheme uses an initial coarse timing estimate for FFT calculation. According to a further embodiment of the invention, timing and frame synchronization are performed jointly, such that no time domain coarse timing estimate is used.

The function of the coarse timing estimation is to roughly find the ranges of the starting positions of OFDM symbols for the strongest BTSs, and therefore to provide FFT window positions for subsequent BTS identification as described in further detail below, as well as further timing and frequency offset estimation. For joint frame and coarse timing synchronization, the frame boundaries and the coarse timing synchronization positions are obtained at the same time.

As in the preceding common synchronization code search scheme, an FFT is performed on a received communication signal, and IACH vectors are extracted from IACH sub-carriers for each of a plurality of positions of a frame window and correlated with the known common synchronization code. Where no initial timing estimate is determined however, the starting position of the FFT window is moved within one OFDM symbol, and for each position of the FFT window, the extraction, correlation, and frame window moving operations are repeated. In one embodiment, the FFT window starting position is moved one sample at a time until the cumulative distance from an initial starting window position is equal to the length of one OFDM symbol. To save processing power and speed up the searching procedure, the FFT window may instead be moved in N-sample steps, where N is a predetermined parameter. According to a preferred embodiment, N is equal to the length of a cyclic prefix of an OFDM signal.

During this two-dimensional search process in which the FFT window and the frame window are moved, frame boundaries can be found by identifying the OFDM symbols, or indexes thereof, related to the correlation peaks. Coarse timing synchronization positions can be obtained through further searching FFT window positions in the vicinity of each individual peak, using procedures substantially similar to those described above but with a smaller step size, to locate FFT window positions corresponding to local maximum correlation values for each correlation peak.

Thus, frame synchronization is based on detection of the common synchronization code, and coarse timing synchronization may be either based on an initial coarse timing estimate or determined jointly with frame synchronization.

After the frame synchronization and the coarse timing synchronization, a communication terminal proceeds to a cell-specific synchronization code search at 164. It will be apparent from the foregoing that where a communication signal received by a terminal includes signals transmitted from multiple BTSs, the terminal obtains several pairs of the synchronization parameters, one pair per BTS. The synchronization parameters include candidate timing positions, as FFT window positions, and candidate frame boundaries. To find the serving BTS, which is the BTS from which the strongest communication signal is received, and active neighbour BTSs for possible BTS selection and handoff, BTS identification operation is performed. This can be done based on the cell-specific synchronization codes carried by IACH.

In one embodiment of the cell-specific code search at 164, for each candidate OFDM symbol or index indicating the beginning of a frame, as determined from the frame synchronization process, an FFT is performed with using a corresponding FFT window determined from the coarse timing synchronization process. Data from the IACH is extracted and correlated with cell-specific synchronization codes of all known BTSs with which a terminal may communicate. As will be apparent to those skilled in the art, a communication terminal is provided with cell-specific synchronization codes for BTSs in a communication network during network registration or activation procedures. The extracted IACH data is correlated with each of these codes or a subset of these codes. A correlation peak indicates the detection of one of the cell-specific synchronization codes. BTS indexes, which are either used as the cell-specific synchronization codes or uniquely associated with the cell-specific synchronization codes, corresponding to the correlation peaks for respective correlation patterns for each of the candidate frame start positions and the related coarse synchronization positions are then determined.

Signal strength measures such as C/I ratio may be calculated for each identified BTS on the basis of a detected cell-specific synchronization code, a common synchronization code, or some combination thereof. The serving BTS is the strongest BTS and other candidate BTSs are the BTS on the active neighbour BTS list.

When the above joint frame synchronization and coarse timing synchronization procedure is used, then the coarse timing positions determined from subsequent searching of the maximum correlation peak positions are used as the FFT window starting positions in the cell-specific synchronization code search for each of the candidate first frame symbols. If an initial coarse timing estimate was made to determine a starting position for the FFT window used for common synchronization code searching at 164, then the same FFT window position would be used for during cell-specific synchronization code searching. In this case, since the same FFT has already been performed, a repetition of the FFT for the cell-specific search may be avoided. For example, the FFT results may be stored in memory during the common synchronization code search for subsequent retrieval during cell-specific synchronization code searching. In another embodiment, data extracted from the IACH is stored. According to a further embodiment, data is extracted from both the IACH and the scattered pilot channel during common synchronization code searching and stored in memory. The storage of FFT results or extracted data reduces the amount of processing required during cell-specific synchronization code searching. Memory access operations are generally faster and less processor-intensive than performing FFTs or other transformations.

To correctly recover communication signals from a serving BTS, a communication terminal further synchronizes to the serving BTS both in time and in frequency at 166. Fine timing synchronization and frequency offset estimation are preferably achieved using the scattered pilot channel. Although a synchronization code may be mapped to the scattered pilot channel in accordance with embodiments of the invention, implementations of the present invention preferably do not preclude the use of the pilot channel for such further synchronization of a terminal to a BTS. Thus, embodiments of the present invention re-use pilot channels for initial access operations but preferably do not preclude conventional uses of such channels for other operations, including channel estimation and fine synchronization.

Figure 11:
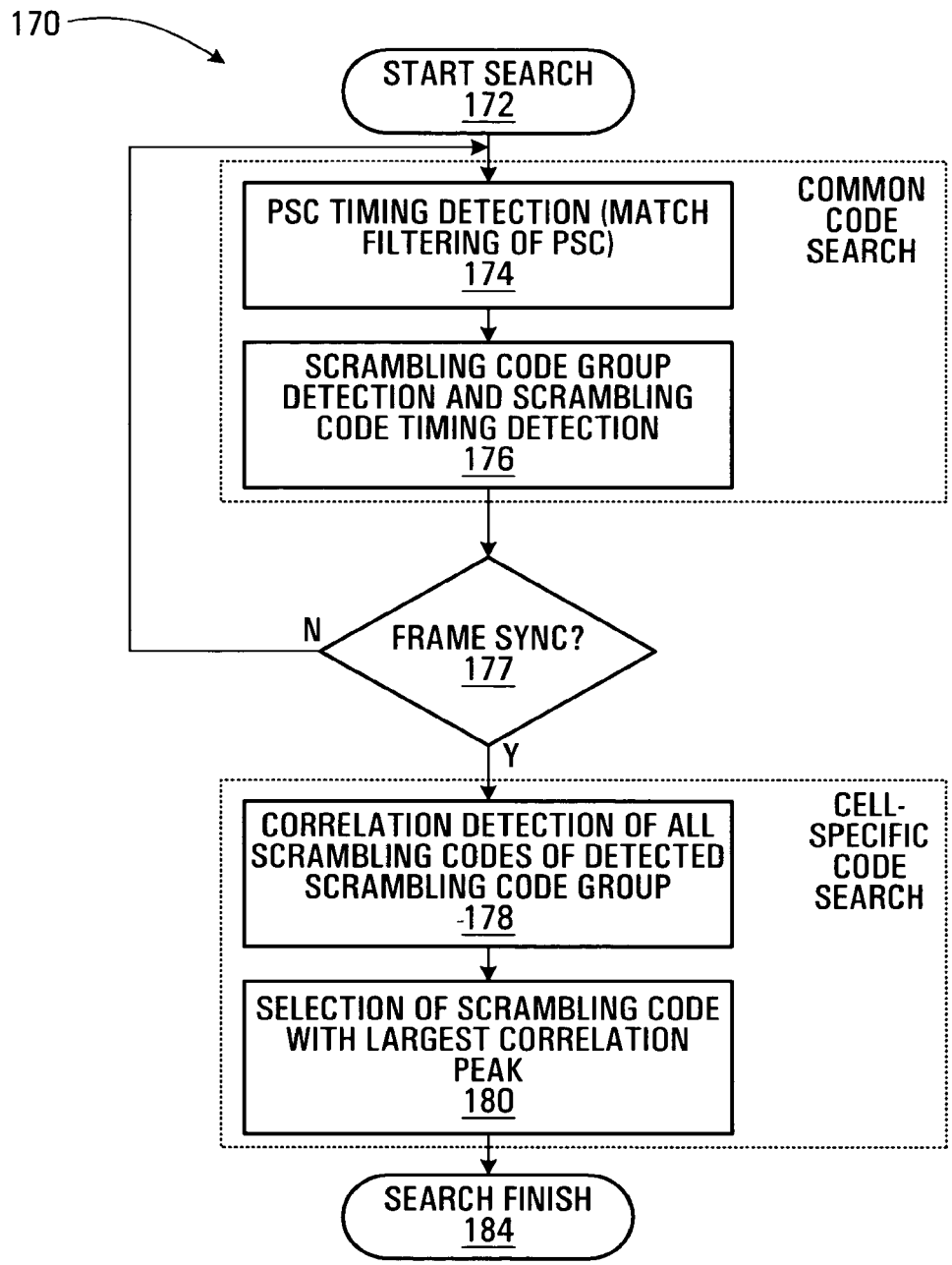
FIG. 11 is a flow chart showing an initial access method according to another embodiment of the invention.

FIG. 11 is a flow chart showing an initial access method according to another embodiment of the invention adapted for 3GPP synchronization codes. The illustrative example method of FIG. 11 is compatible with standard 3GPP operations with respect to the PSC, SSC, and scrambling code. Such a backward-compatible initial access scheme allows re-use of the CDMA (Code Division Multiple Access) search engine of 3GPP terminals to perform the cell search for asynchronous OFDM communication networks.

The method 170 begins at 172 when a cell search operation is initiated. A cell search may be initiated by a user of a communication terminal or by the terminal itself, for example at predetermined intervals or when received signal strength or quality between the terminal and a current BTS degrades to a predetermined degree.

In the method 170, common synchronization code searching includes searching for the PSC, or a portion thereof, which is common to all BTSs in a communication network, at 174, as well as searching for the SSC at 176. PSC detection at 174 is normally accomplished using a matched filter or a similar device that is matched to the known PSC for the communication network. Scrambling code group detection at 176 involves detection of a sequence of SSCs that is associated with a particular scrambling code group. SSC detection is preferably performed substantially as described above, by correlating data extracted from the IACH with the SSCs corresponding to the detected PSC. As described above, an SCE sequence of 15 of the 16 SSCs associated with a PSC, which are also known or can be determined by the terminal, identifies the scrambling code group to which the primary scrambling code used by a BTS belongs. SCE sequence detection is preferably performed by correlation of extracted IACH data with each of the 64 SCE sequences associated with the PSC, but may instead be performed on an SSC-by-SSC basis.

The method 170 then proceeds to 177 to determine whether frame synchronization has been achieved. The determination at 177 involves making a determination as to whether any candidate frame start positions have been identified. If not, then the method 170 reverts back to the common code search operation. When one or more candidates have been identified, the cell-specific synchronization code search operations at 178-182 are performed for each candidate. At 178, after the scrambling code group has been determined at 176, data is extracted from the IACH and correlated with each of the primary scrambling codes in the scrambling code group. The primary scrambling code corresponding to the largest correlation peak in the resultant correlation patterns and thus the strongest BTS is selected at 180 and used, and the search procedure ends at 184.

Although not explicitly shown in FIG. 11, it should be appreciated that the operations in FIG. 11 may be repeated, such as to ensure that a selected BTS is still the strongest BTS or when subsequent communication signals received from the selected BTS cannot be properly decoded. This may involve repeating 178 and 180 for previously identified candidate BTSs, or repeating the entire search procedure to identify new candidate BTSs.

Figure 12:
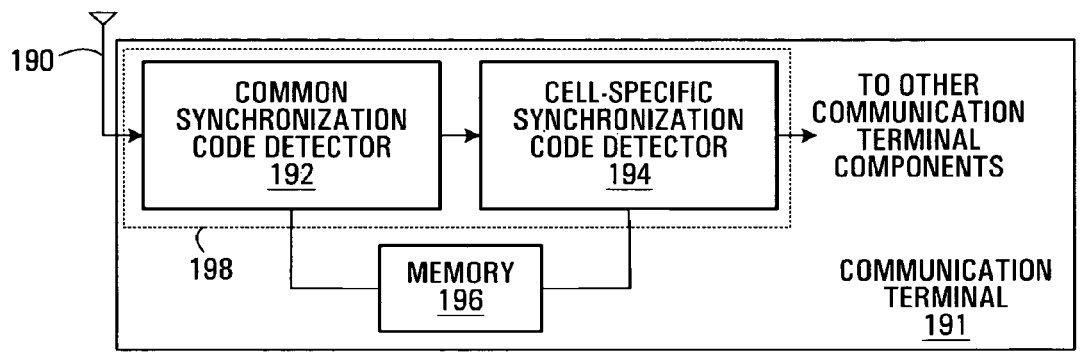
FIG. 12 is a block diagram of a communication terminal.

FIG. 12 is a block diagram of a communication terminal in which the present invention may be implemented. The communication terminal 191 includes an antenna 190 connected to a common synchronization code detector 192, which is connected to a cell-specific synchronization code detector 194. Both code detectors 192, 194 are connected to a memory 196.

The antenna 190, although shown as a single antenna, may include multiple antenna elements, to provide receive diversity, for example.

The common synchronization code detector 192 and the cell-specific synchronization code detector 194 detect synchronization codes in received signals substantially as described above. The detectors 192, 194 are preferably implemented in software code, such as a module executable by a processor (not shown) in the communication terminal 191. In a preferred embodiment, both detectors 192, 194 are implemented in a DSP 198, which may also support other signal processing functions of the communication terminal 191. Thus, a communication terminal 191 according to an embodiment of the invention includes an input for receiving communication signals and a processor for processing received signals.

Data for synchronization code detection, including a common synchronization code and at least one cell-specific synchronization code, is stored in the memory 196. The memory 196, preferably a solid state memory component, may also store data associated with other signal processing functions or other components of the communication terminal 191. In some communication terminals, the memory 196 is removable, for example as part of a computer card that enables the terminal for network communications. For the purposes of synchronization code detection, the detectors 192, 194 read information from the memory 196. However, the detectors 192, and other components of the communication terminal 191 may also read and preferably write data to the memory 196. A writeable memory 196 supports such functions as over-the-air communication network information updates.

The operation of the communication terminal 191 in accordance with embodiments of the invention will be apparent from the foregoing description. The common synchronization code detector 192 receives communication signals from one or more BTSs via the antenna 190 and searches for a known common synchronization code that was previously stored to the memory 196 and is retrieved from the memory 196 during a cell search operation. A coarse timing estimator may or may not be provided in the detector 192, as coarse timing estimation may be performed jointly with frame synchronization. Where a coarse timing estimator is provided, implementation of the memory 196 in a writeable store allows the detector 192 to store FFT results and possibly data extracted from the IACH to the memory 196. The common synchronization code detector 192 outputs pairs of synchronization parameters, including candidate first frame symbols and candidate FFT window positions, to the cell-specific synchronization code detector 194 and/or the memory 196.

The cell-specific synchronization code detector 194 similarly searches a received communication signal for one or more cell-specific synchronization codes, based on the candidate first frame symbols and coarse timing estimates from the common synchronization code detector 192. In FIG. 12, the cell-specific synchronization code detector 194 is configured to receive both synchronization parameters and a received communication signal through the common synchronization code detector 192. In other embodiments, the cell-specific synchronization code detector 194 is connected to the antenna 190 and thus receives synchronization parameters from the common synchronization code detector 192 and receives a communication signal from the antenna 190.

As described above, repetition of FFT and possibly data extraction operations may be avoided, particularly where an initial coarse timing estimator is provided, by storing FFT results and data extracted from the IACH to the memory 196 during common synchronization code searching. The cell-specific synchronization code detector 194 then retrieves FFT results and/or extracted data from the memory 196.

Those skilled in the art will appreciate that only components that are involved in initial access operations according to embodiments of the invention have been shown in the communication terminal 191. A communication terminal normally includes further components for supporting other functions. The present invention is in no way limited to communication terminals that include only those elements shown in FIG. 12.

Figure 13:
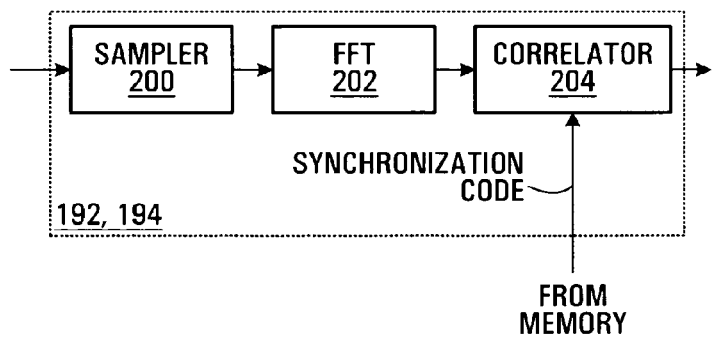
FIG. 13 is a block diagram of a synchronization code detector.

FIG. 13 is a block diagram of a synchronization code detector. Although each of the code detectors 192, 194 is configured to search for a different synchronization code retrieved from memory, the code searching algorithms preferably include sampling, transformation, and correlation operations performed by the sampler 200, the FFT element 202, and the correlator 204. In a preferred embodiment, the functional elements 200, 202, 204 are implemented at least partially in software code that is invoked during both common synchronization code searching and cell-specific synchronization code searching. Hardware may similarly be shared between the detectors 192, 194.

At a BTS side, a system supporting the physical layer structure and initial access schemes according to embodiments of the invention is analogous to the communication terminal 191. The common and cell-specific synchronization codes detected by a communication terminal are mapped onto components of signals to be transmitted by a BTS by modulating the signal components or carriers thereof, sub-carriers for OFDM-based networks, using the synchronization codes. The synchronization codes are stored in a memory and retrieved from the memory when needed. The BTS may include one or more antennas for transmitting communication signals carrying the IACH and possibly pilot channels.

Figure 14:
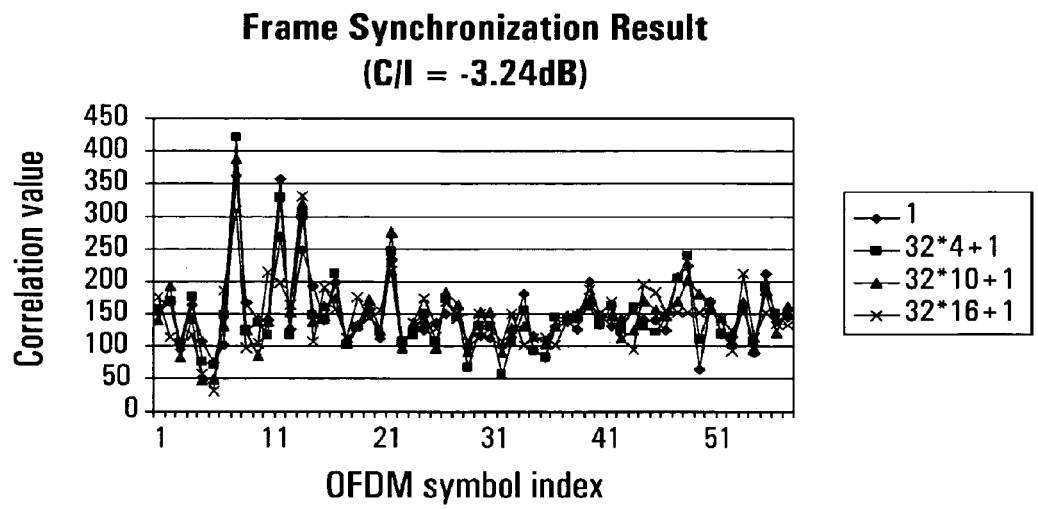
FIG. 14 is a plot of correlation value versus OFDM symbol index illustrating an example joint frame synchronization simulation result.
Figure 15:
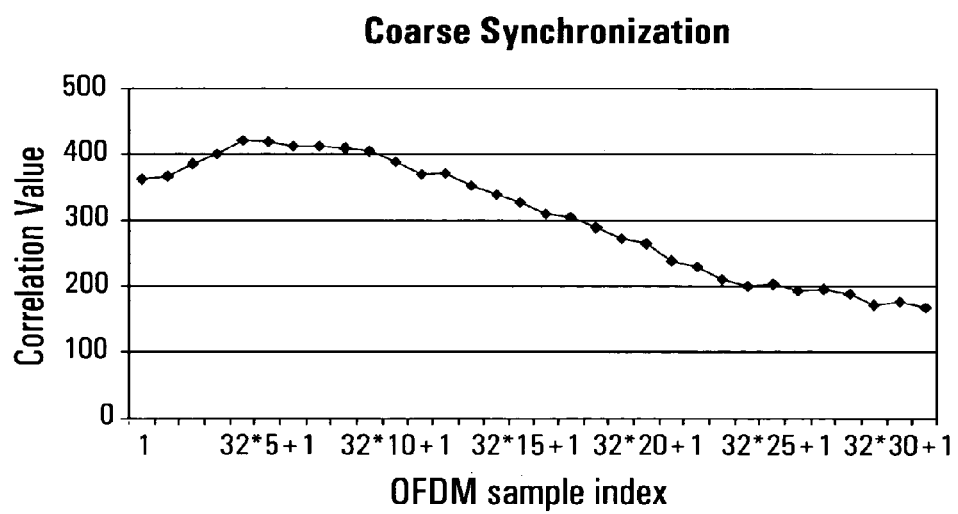
FIG. 15 is a plot of correlation peak value versus OFDM sample index for FFT window positions.

FIGS. 14 and 15 illustrate example joint frame and coarse timing synchronization simulation results. The simulation conditions from which the plots shown in FIGS. 14 and 15 were generated are as follows:

ITU-VA (International Telecommunication Union-Vehicular A) channel
Communication terminal speed: 30 km/h
C/I=−3.24 dB
Eight BTSs
60 OFDM symbols per 10 ms frame
OFDM indexes for the first OFDM symbols in the frames from each BTS, respectively: 14, 12, 8, 22, 27, 17, 2, 32
Location of the first sample following the end of the prefix of an OFDM symbol for each BTS, respectively: 512 10 120 300 350 80 260 500
Coarse synchronization search step (=prefix length): 32 samples.

The above conditions were chosen solely as an illustrative embodiment of the invention for the purposes of simulation. As such, the invention is in no way limited to this particular embodiment.

It can be seen from FIG. 14 that the first OFDM symbol positions for the four strongest BTSs, corresponding to symbol indexes 8, 12, 14, and 22, can be identified based on correlation peaks. For FIG. 15, the third BTS, which is the strongest BTS having a first symbol position of 8 and a first sample location of 120, is used as the example. The maximum correlation value is close to the 161st sample (32*5+1), which is within one coarse synchronization search step (32 samples) of the first sample location of 120+32 sample prefix=152. Subsequent searching of the peak position with a smaller step size would improve the accuracy of the determination of first sample location.

Numerous modifications and variations of the present invention are possible in light of the above teachings. It is therefore to be understood that within the scope of the appended claims, the invention may be practised otherwise than as specifically described herein.

For example, although described primarily in the context of OFDM, the invention may be implemented in communication networks that use other types of communication signals that include multiple signal components. In accordance with an embodiment of the invention, the IACH is mapped to one or more sets of time-continuous signal components having a common frequency.

The invention is similarly not limited to any particular type of synchronization channel. 3GPP synchronization codes and scrambling codes are described above solely for illustrative purposes.

In addition, it should be appreciated that the invention may be implemented in communication networks in which BTSs, communication terminals, or both, include multiple antennas. Such networks include, but are not limited to, MIMO, MIMO-BLAST, STTD (Space Time Transmit Diversity), and SFTD (Space Frequency Transmit Diversity) networks.

What is claimed is:

1. A method of accessing a communication network comprising:
    receiving a communication signal having a plurality of sets of time-continuous signal components, the communication signal being an OFDM (Orthogonal Frequency Division Multiplexing) signal;
    determining a transformation window start position, the transformation window having a length of a predetermined period and corresponding to at least a portion of the plurality of sets of time-continuous signal components;
    searching for access channel information within the transformation window in at least one predetermined set of the plurality of sets of time-continuous signal components, each of the at least one predetermined set of time-continuous signal components comprising signal components carried by a respective sub-carrier in a plurality of OFDM symbols;
    wherein the searching includes iteratively moving the transformation window in time from the start position and subsequently performing a transformation and a correlation operation for each new window position to find a common synchronization code associated with a plurality of base stations in the communication network; and
    determining synchronization parameters based on a location of the access channel information in the at least one predetermined set of time-continuous signal components.

2. The method as claimed in claim 1, wherein searching further comprises searching for any of a plurality of cell-specific synchronization codes respectively uniquely associated with the plurality of base stations.

3. The method as claimed in claim 2, wherein searching for the common synchronization code further comprises:
    sampling the received communication signal;
    performing a time domain to frequency domain transformation using the transformation window starting at the start position to generate a frequency domain signal;
    extracting frequency domain data corresponding to the at least one predetermined set of time-continuous signal components from the frequency domain signal within the transformation window;
    correlating the extracted data with the common synchronization code;
    moving the predetermined period-length window by a predetermined step size until a starting position of the predetermined period-length window has been moved a distance of at least the predetermined period;
    repeating the extracting and correlating for each position of the predetermined period-length window; and
    determining peak correlation values indicating occurrences of the common synchronization code.

4. The method of claim 3, wherein the communication signal comprises a plurality of frames, each frame comprising a plurality of symbols, wherein the predetermined period is a length of each of the frames, and wherein the step size is a length of each of the symbols.

5. The method of claim 1, wherein searching for the access channel information comprises searching for a primary synchronization code, or a portion thereof, which is common to a plurality of base stations in a network, as well as searching for a secondary synchronization code.

6. The method of claim 5, wherein the secondary synchronization code (SSC) is associated with a scrambling code group.

7. The method of claim 5, wherein a secondary synchronization code is detected by correlating data extracted from an initial access channel (IACH) including the secondary synchronization code corresponding to the detected primary synchronization code.

8. The method of claim 7, wherein the extracted data are a scrambling code group to which the primary scrambling code used by a base station belongs.

9. The method of claim 1, wherein the transformation window moves a predetermined step size within one of the plurality of OFDM symbol.

10. The method as claimed in claim 8, wherein after determining of the scrambling code group, data is extracted from the IACH and correlated with each of the primary scrambling codes in the scrambling code group.

11. The method as claimed in claim 8, wherein the primary scrambling code is used to acquire a connection with a particular base station.

12. The method as claimed in claim 7, wherein after determining a scrambling code group, data is extracted from the IACH and correlated with each primary scrambling code in the scrambling code group.

13. The method as claimed in claim 12, wherein the primary scrambling code is used to acquire a connection with a particular base station.

14. The method as claimed in claim 1, wherein the predetermined period of the transformation period corresponds to a width of one OFDM symbol.

15. A wireless communication device comprising:
    an antenna;
    a receiver coupled to the antenna and configured to:
    receive a communication signal having a plurality of sets of time-continuous signal components, the communication signal being an OFDM (Orthogonal Frequency Division Multiplexing) signal;
    determine a transformation window start position, the transformation window having a length of a predetermined period and corresponding to at least a portion of the plurality of sets of time-continuous signal components;
    search for access channel information within the transformation window in at least one predetermined set of the plurality of sets of time-continuous signal components, each of the at least one predetermined set of time-continuous signal components comprising signal components carried by a respective sub-carrier in a plurality of OFDM symbols;
    iteratively move the transformation window in time from the start position and to subsequently perform a transformation and a correlation operation for each new window position to find a common synchronization code associated with a plurality of base stations in the communication network; and
    determine synchronization parameters based on a location of the access channel information in the at least one predetermined set of time-continuous signal components.

16. The wireless communication device of claim 15, wherein the receiver is further configured to search for any of a plurality of cell-specific synchronization codes, wherein each of the cell-specific synchronization codes is uniquely associated with the plurality of base stations.

17. The wireless communication device of claim 15, wherein the receiver is further configured to:
    sample the received communication signal;

perform a time domain to frequency domain transformation using the transformation window starting at the start position to generate a frequency domain signal;

extract frequency domain data corresponding to the at least one predetermined set of time-continuous signal components from the frequency domain signal within the transformation window;

correlate the extracted data with the common synchronization code;

move the predetermined period-length window by a predetermined step size until a starting position of the predetermined period-length window has been moved a distance of at least the predetermined period;

repeat the extracting and correlating for each position of the predetermined period-length window; and determine peak correlation values indicating occurrences of the common synchronization code.

18. The wireless communication device of claim 15, wherein the predetermined period of the transformation period corresponds to a width of one OFDM symbol.

* * * * *